United States Patent [19]

Fujioka et al.

[11] Patent Number: 4,581,569

[45] Date of Patent: Apr. 8, 1986

[54] AC MOTOR CONTROL APPARATUS

[75] Inventors: Yoshiki Fujioka, Higashi Yamato; Mitsuhiko Hirota, Tokyo, both of Japan

[73] Assignee: Fanuc Limited, Minamitsuru, Japan

[21] Appl. No.: 626,861

[22] PCT Filed: Nov. 2, 1983

[86] PCT No.: PCT/JP83/00395

§ 371 Date: Jun. 29, 1984

§ 102(e) Date: Jun. 29, 1984

[87] PCT Pub. No.: WO84/01865

PCT Pub. Date: May 10, 1984

[30] Foreign Application Priority Data

Nov. 2, 1982 [JP] Japan ............................ 57-192947
Nov. 17, 1982 [JP] Japan ............................ 57-201695

[51] Int. Cl.[4] .......................................... H02P 5/40
[52] U.S. Cl. .................................. 318/811; 318/803
[58] Field of Search ................ 318/811, 803, 807–810

[56] References Cited

U.S. PATENT DOCUMENTS

| 4,364,109 | 12/1982 | Okado et al. | 318/811 |
| 4,387,421 | 6/1983 | Zach et al. | 318/811 |
| 4,409,534 | 10/1983 | Bose | 318/811 |
| 4,419,615 | 12/1983 | Muto et al. | 318/811 |

*Primary Examiner*—David Smith, Jr.
*Attorney, Agent, or Firm*—Staas & Halsey

[57] ABSTRACT

An AC motor control apparatus having a first arithmetic device (3) which calculates an amplitude command based on a difference between the commanded velocity and the actual velocity of the AC motor (1), and delivers the amplitude command and a current command in at least one phase as outputs. Also included is a second arithmetic device (10) which calculates a pulse width command in each phase from the amplitude command and current command from the first arithmetic device (3) and the actual phase current of the AC motor (1). A timer (11) produces as an output, a pulse-width modulated signal in each phase on the basis of the pulse-width command from the second arithmetic device (10), and an inverter (8) drives the AC motor in accordance with the pulse-width modulated signals from the timer (11).

6 Claims, 17 Drawing Figures

Fig. 2 PRIOR ART
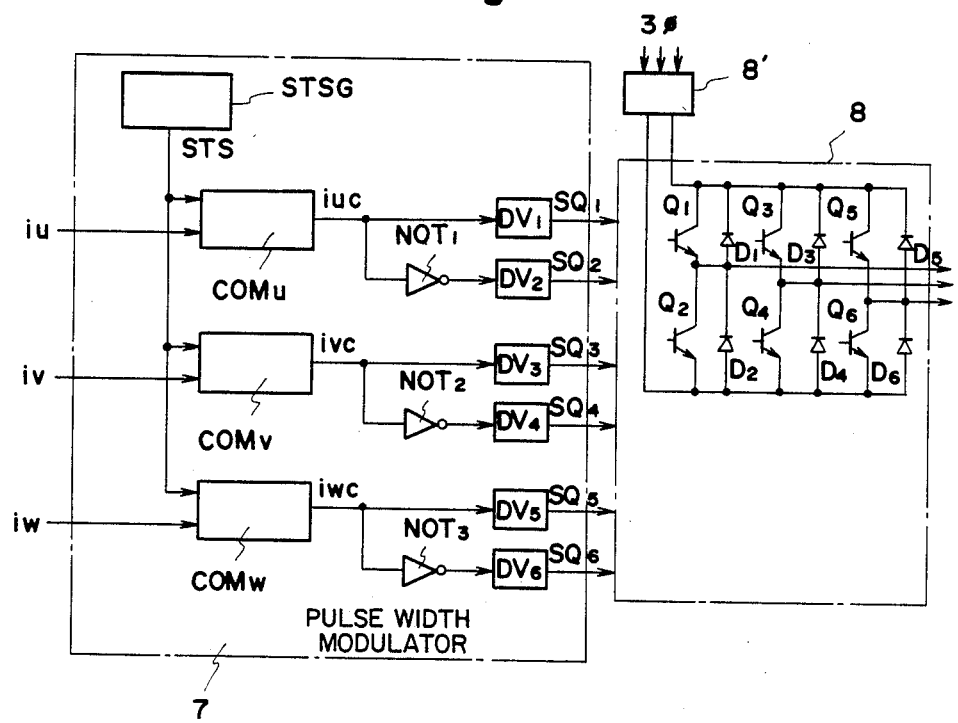
Fig. 3 PRIOR ART
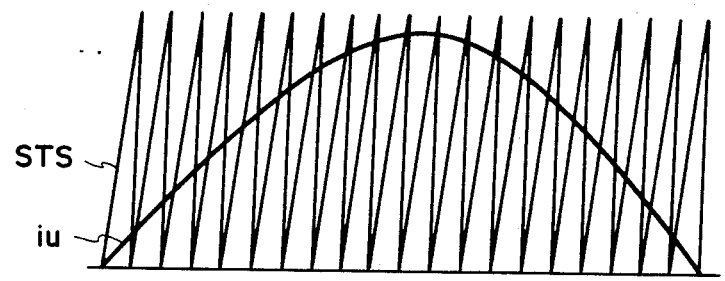

AC MOTOR CONTROL APPARATUS

DESCRIPTION

BACKGROUND OF THE INVENTION

This invention relates to an AC motor control apparatus in which the current loop of an AC motor such as an induction motor is in digital form.

The recent spread of microcomputers has made it possible to substitute a microcomputer for a variety of discrete circuits. This holds for the control circuit of an AC motor, particularly the velocity control loop of which has already been placed under the control of a microcomputer.

FIG. 1 is a block diagram of a conventional AC motor control circuit. In FIG. 1, numeral 1 denotes a three-phase AC motor such as one for rotating the spindle of a machine tool. Numeral 2 denotes a pulse generator for producing velocity pulses TSA in dependence upon the rotation of the AC motor 1. Numeral 3 designates an arithmetic unit comprising a computer and which is part of a control section for the motor 1. The arithmetic unit 3 senses the actual velocity RV of the AC motor 1 on the basis of the velocity pulses TSA from the pulse generator, and produces an amplitude command Id as well as U- and V-phase phase commands $\theta$ud, $\theta$vd in dependence upon the difference between the actual velocity and a commanded velocity CV. The arithmetic unit 3 is composed of a processor 30 for performing processing, a program memory 31 storing a control program, a data memory 32 for storing various data, input/output ports 33, 34, a counter 35, and an address/data bus 36 interconnecting these components. The processor 30, in accordance with the control program in the program memory 31, reads via the bus 36 a value recorded in the counter 35, which counts the velocity pulses TSA, obtains the actual velocity RV of the AC motor 1 from the difference between the read value and the previously read value the processor 30 then, calculates the amplitude command Id on the basis of the difference between the actual velocity and the commanded velocity CV issued by an external unit, and applies the amplitude command to the input/output port 33 through the bus 36. Further, in accordance with the control program, the processor 30 retrieves a phase conversion table in the data memory 32 on the basis of the value from the counter 35, reads the corresponding U- and V-phase phase commands $\theta$ud and $\theta$vd, respectively, and applies these commands to the input/output port 34 via the bus 36. In order to deliver current commands Iud, Ivd in the form of U- and V-phase sinusoidal signals to which motor excitation frequency wt has been applied, the phase conversion table is stored digitally in the form of numerical values representing each of the crest or peak values of the sinusoidal signals.

Numeral 4a denotes a digital/analog converter (DA circuit) for converting the digital amplitude command Id into an analog amplitude command Is. Numerals 4b, 4c denote multiplying-type digital/analog conversion circuits for converting the respective U- and V-phase current commands Iud, Ivd into analog quantities and for multiplying these analog quantities by the analog amplitude command Is to produce analog U- and V-phase current commands Iu, Iv, respectively. Numeral 5 designates a W-phase current forming circuit for forming a W-phase current command Iw from the analog U- and V-phase current commands Iu, Iv. Numeral 6 represents an operational amplifier for obtaining the difference between actual phase currents and the commanded currents Iu, Iv, Iw in the respective phases. The operational amplifier 6 is composed of an operational amplifier for calculating the difference between the commanded currents Iu, Iv, Iw in the respective phases, and the actual phase currents Iau, Iav, Iaw, respectively, and an arithmetic unit 10 for producing a W-phase phase current Iaw by adding Iav and Iau, which are sensed by current transformers 9r, 9s. Numeral 7 denotes a pulse-width modulating circuit, and numeral 8 an inverter controlled by an output signal from the pulse-width modulating circuit for providing a DC voltage derived from an externally provided three-phase AC power supply and a rectifying circuit (a group of diodes and a capacitor) for rectifying the three-phase alternating current into a direct current. As shown in FIG. 2, the pulse-width modulating circuit 7 includes a sawtooth waveform generating circuit STSG for generating a sawtooth waveform STS, comparators COMu, COMv, COMw, NOT gates NOT$_1$ through NOT$_3$, and drivers DV$_1$ through DV$_6$. The inverter 8 includes six power transistors Q1 through Q6 and six diodes D1 through D6. The comparators COMu, COMv, COMw of the pulse-width modulating circuit 7 compare the sawtooth signal STS with the amplitudes of the three-phase AC signals iu, iv, iw, respectively, and produce a "1" output when the magnitude of STS is exceeded by iu, iv or iw, or a "0" output when the magnitude of STS is greater. Thus, with respect to iu, the comparator COMu produces the current command iuc shown in FIG. 3. More specifically, pulse-width modulated three-phase current commands iuc, ivc, iwc dependent upon the amplitudes of iu, iv, iw are produced. These current commands iuc, ivc, iws are then converted into drive signals SQ1 through SQ6 by the NOT gates NOT$_1$ through NOT$_3$ and drivers DV$_1$ through DV$_6$, whereby the on/off, action of the power transistors Q1 through Q6 of the inverter 8 is controlled. Numeral 8' denotes a rectifying circuit for the above-mentioned direct current feed.

Next, the operation of the arrangement shown in FIG. 1 will be described for a case where the AC motor 1 is rotating at the actual velocity RV. The processor 30 of the arithmetic unit 3 reads the value in the counter 35, which counts the velocity or rotational pulses TSA, through the bus 36 to sense the actual velocity RV of the AC motor 1. Next, the processor 30 calculates the amplitude command Id on the basis of the difference between the commanded velocity CV and the sensed actual velocity, retrieves the phase conversion table from the memory 32, reads out the corresponding U- and V-phase current commands Iud, Ivd and, via the bus 36, applies the amplitude Id to the input/output port circuit 33 and the U- and V-phase current commands Iud, Ivd to the input/output port circuit 34. The amplitude command Id from the input/output port 33 is converted into an analog amplitude command Is by the digital/analog conversion circuit 4a, which command is then applied to the multiplying-type digital/analog conversion circuits 4b, 4c. Meanwhile, the U- and V-phase current commands Iud, Ivd are converted into analog quantities by the respective multiplying-type digital/analog conversion circuits 4b, 4c, which quantities are multiplied by the analog amplitude command Is to be converted into analog U- and V-phase current commands Iu, Iv. The U- and V-phase current commands Iu, Iv are applied to the W-phase current forming circuit 5, which produces the W-phase current Iw. The W-phase current Iw is applied to the operational amplifier 6 together with the U- and V-phase current commands Iu, Iv, respectively. The operational amplifier 6 receives the actual phase currents Iau, Iav from the converters 9r, 9s and forms the W-phase phase current Iaw. The operational amplifier 6 also produces three-phase AC signals iu, iv, iw, which are the differences between the three-phase current commands Iu, Iv, Iw and respective ones of the actual phase currents Iau, Iav, Iaw. The three-phase AC signals Iu, iv, iw indicative of these differences are applied to the respective comparators COMu, COMv, COMw of the pulse-width modulating circuit 7. The comparators COMu, COMv, COMw compare the amplitudes of the three-phase AC signals iu, iv, iw with the amplitude of the sawtooth STS, and deliver as outputs three-phase current commands iuc, ivc, iwc produced by way of pulse width modulation. The outputs from the comparators are supplied to the NOT gates $NOT_1$ through $NOT_3$ and to the drivers $DV_1$ through $DV_6$, which generate the inverter drive signals SQ1 through SQ6. The inverter drive signals SQ1 through SQ6 are applied to the bases of the power transistors Q1 through Q6, respectively, in the inverter 8, and control the on/off action of the power transistors Q1 through Q6 for supplying three-phase current to the AC motor 1. The AC motor 1 will thenceforth be controlled in a similar mode until the motor eventually rotates at the commanded velocity.

With the AC motor control apparatus having this conventional construction, the current loop requires a quick response. Therefore, the DA conversion circuits 4a through 4c, the operational amplifier 6 and the pulse-width modulating circuit 7, which are the current loop, inevitably are composed of discrete circuits and are difficult to convert into digital form. As a consequence, the apparatus includes a large number of component parts and is possessed of complicated circuitry.

Moreover, due to the storage time of the power transistors Q1 through Q6 in the inverter 8, there is the danger that the upper and lower sides of the inverter will be short-circuited by the upper transistor Q1 and lower transistor Q2 turning on simultaneously. Accordingly, it is necessary that the drive signals SQ1, SQ2 be provided with a dead zone. This is difficult to achieve in digital fashion.

In addition, less current ripple is produced if the pulse-width modulating circuit compares triangular waves rather than sawtooth waveforms. The fact that the triangular wave comparison must be realized digitally further complicates the digitalization of the apparatus.

SUMMARY OF THE INVENTION

An object of the present invention is to provide an AC motor control apparatus current control loop can be put into digital form with facility.

Another object of the present invention is to provide an AC motor control apparatus simplified by putting the current control loop into digital form, and in which an inverter drive signal is provided with a dead zone in digital fashion.

Still another object of the present invention is to provide an AC motor control apparatus in which a current control loop is capable of being converted into digital form, and in which an arrangement for sensing phase currents can be simplified.

A further object of the present invention is to provide a pulse-width modulating circuit capable of digitally generating a pulse-width modulated signal by relying upon triangular wave comparison.

The present invention provides an AC motor control apparatus which has first arithmetic means for calculating an amplitude command based on a difference between the commanded velocity and the actual velocity of the AC motor, and for delivering the amplitude command and a current command in at least one phase as outputs. Also included are a current sensing circuit for sensing actual phase currents of the AC motor and second arithmetic means for calculating a pulse width command in each phase from the amplitude command and current command of the first arithmetic means and the actual phase current of the AC motor. A timer is also included for producing as an output a pulse-width modulated signal in each phase on the basis of the pulse width command of the second arithmetic means, along with an inverter for driving the motor in accordance with the pulse-width modulated signals of the timer.

In addition, an AC motor control apparatus is provided in which a bus control circuit is provided between the first arithmetic means and the second arithmetic means for severing or disconnecting a bus on the side of the first arithmetic means from a bus on the side of the second arithmetic means. An analog/digital conversion circuit is connected to the bus on the side of the second arithmetic means. The bus on the side of the first arithmetic means is severed from the bus on the side of the second arithmetic means by the bus control circuit, when the second arithmetic means reads in the actual phase currents from the analog/digital conversion circuit. The invention also includes an AC motor control apparatus having a dead zone generating circuit for applying a dead zone to the pulse-width modulated signals of the timer to produce inverter drive signals, and an inverter for driving the AC motor in accordance with the pulse-width modulated signals of the timer. The dead zone generating circuit includes an integrating circuit for integrating the pulse-width modulated signals and a hysteresis circuit having different slice levels with respect to an output from the integrating circuit, the slice level at rise time being different from the slice level at decay time. An AC motor control apparatus is also include which is equipped with a current sensing circuit for sensing the phase currents of the AC motor including current sensor for sensing currents in at least two phases, an analog switch provided for each of the phases in which current is sensed, and a changeover circuit for changing over the analog switches in response to a control signal from the second arithmetic means, the sensed currents being successively applied to an analog/digital converter via the analog switches. An AC motor control apparatus is further included in which the first and second arithmetic means are arithmetic means for calculating ON time depending upon a reference triangular signal corresponding to a level of a signal to be modulated from a pulse-width modulating circuit. The pulse-width modulating circuit produces a pulse-width modulated signal by comparing the signal to be modulated with the reference triangular signal the arithmetic means is also for calculating OFF time from the start of the reference triangular signal based on the period of the reference triangular signal and the OFF time. The AC motor control apparatus also first counter means set to the OFF time for counting the set OFF time and second counter means set to the ON time for counting the set ON time after the OFF time is counted. The AC motor control apparatus including the pulse-width modulating circuit is delivering, as an output, a pulse-width modulated signal from the second counter means.

Therefore, according to the present invention, the entirety of the current control loop of the AC motor control apparatus can be put into digital form, and second arithmetic means are employed. As a result, advantages such as a reduction in the number of component parts and lower cost are obtained. Moreover, a current loop requiring quick response can be put into digital form without increasing the load on the first arithmetic means.

Furthermore, by providing the dead zone generating circuit, a dead zone is applied to the drive signals for driving power transistors for the inverter. As a result, both processors do not perform complicated calculations for applying the dead zone. Hence, there is no deterioration in the quick response of the current loop, and even the current loop can be put into digital form. Since pulse width modulation based on triangular wave comparison is capable of being carried out digitally, construction is simplified and inclusion of ripple in the current that flows into the AC motor is reduced.

BRIEF DESCRIPTION OF THE DRAWINGS

FIG. 2 is a view showing the construction of a principal portion of the arrangement shown in FIG. 1;

FIG. 3 is a view for describing the operation of the arrangement shown in FIG. 2;

DESCRIPTION OF THE PREFERRED EMBODIMENTS

A detailed description will now be had with reference to the accompaning drawings to clarify the present invention.

Figure 1:
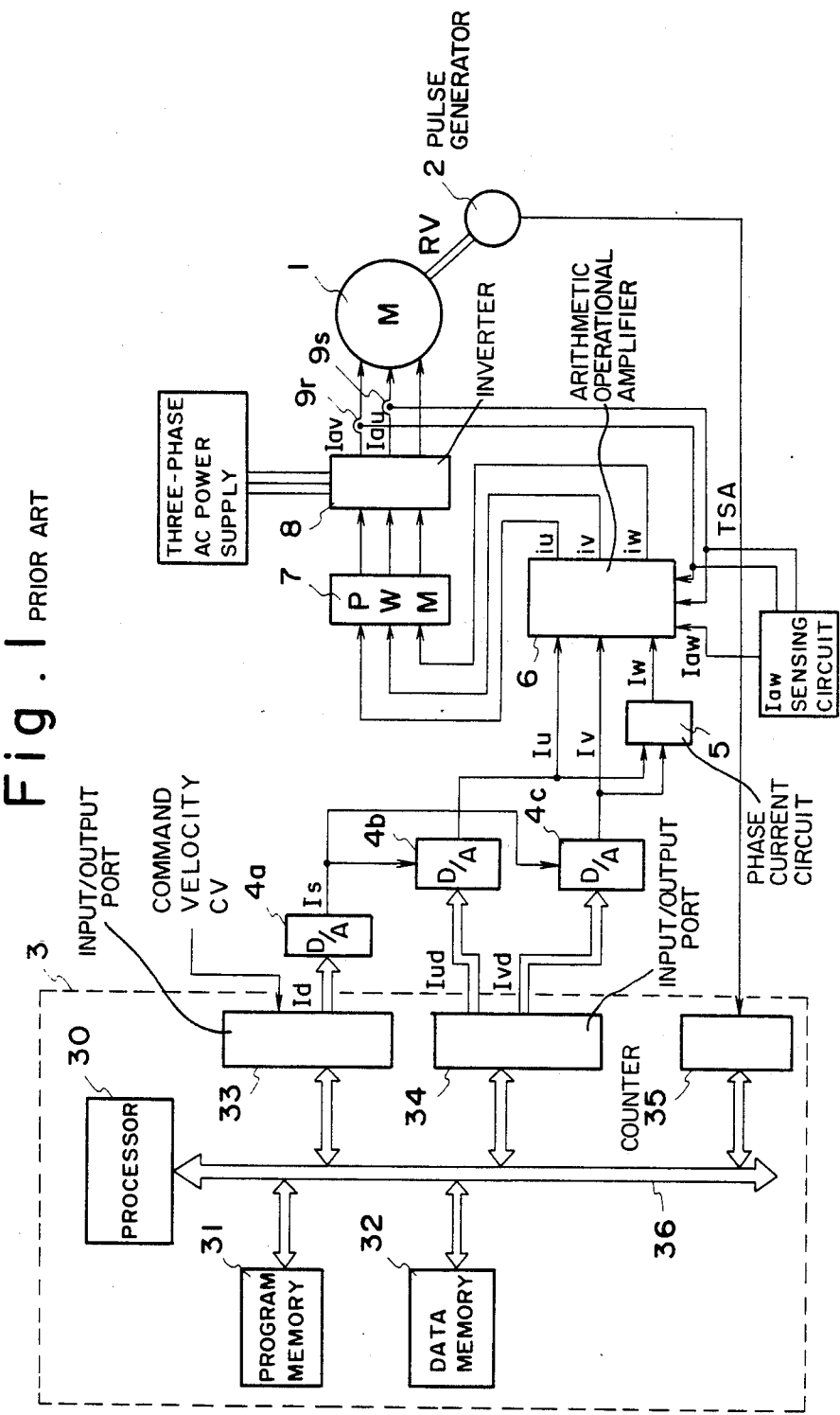
FIG. 1 is a block diagram of a prior-art AC motor control circuit.
Figure 4:
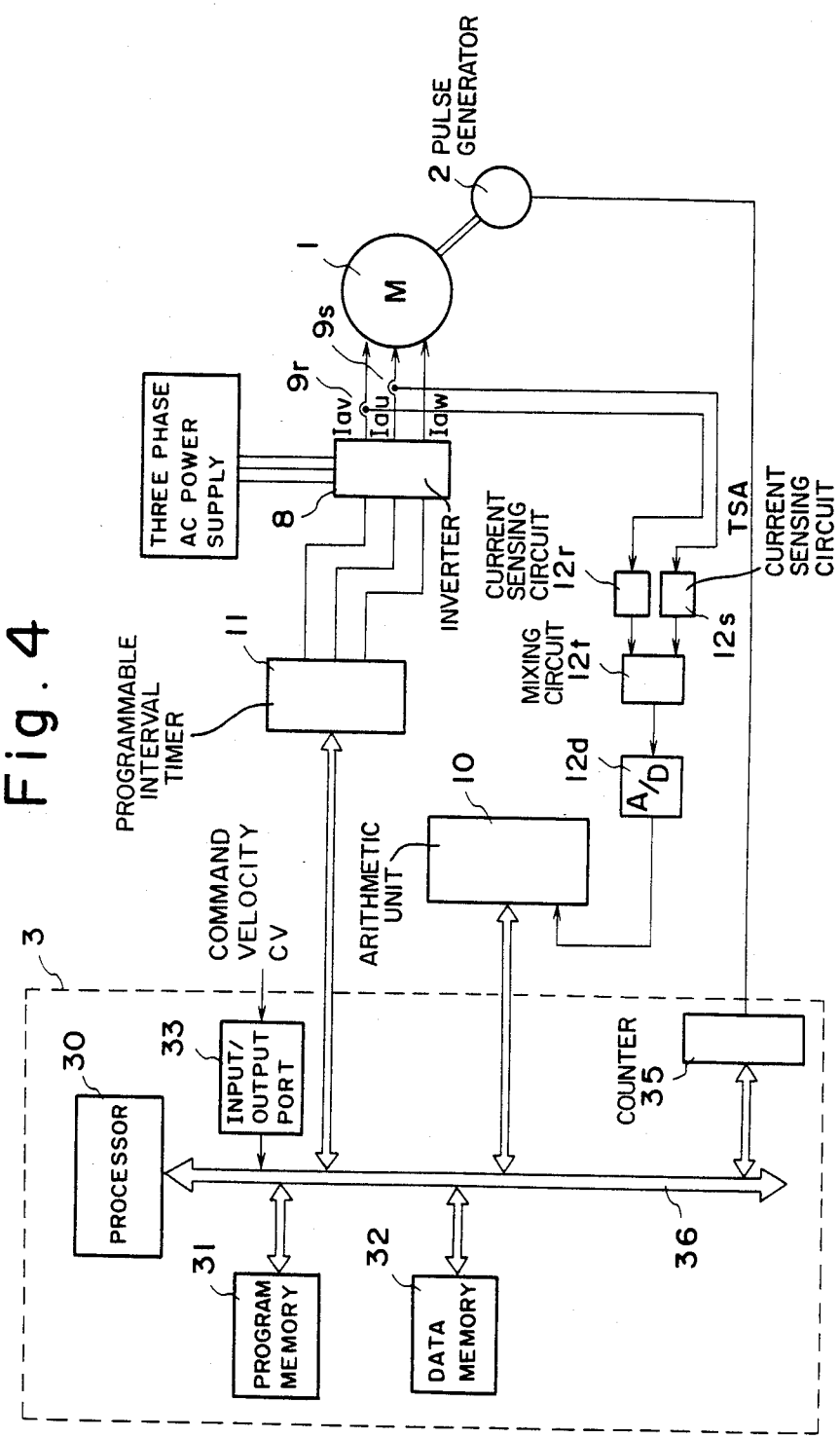
FIG. 4 is a block diagram illustrating an embodiment of the present invention.

FIG. 4 is a block diagram of an embodiment of the present invention, in which portions similar to those shown in FIG. 1 are designated by like reference characters. In FIG. 4, numeral 10 denotes an arithmetic unit, coupled directly to the bus 36 of the processor 30 via a bus control circuit as described below, for performing processing in accordance with commands from the processor 30. Numeral 11 denotes a programmable interval timer (hereafter referred to as a timer) for producing pulse-width modulated signals in accordance with a pulse width command signal. Numerals 12r, 12s denote current sensing circuits for amplifying the phase curents Iav, Iau sensed by the current transformers 9r, 9s, respectively. Numeral 12t denotes a mixing circuit for delivering the phase currents Iau, Iav in a time-sharing manner. Numeral 12d designates an analog/digital conversion circuit (hereafter referred to as an AD converter) for converting the analog phase currents Iav, Iau from the mixing circuit 12t into digital values, which are then applied to the arithmetic unit 10.

According to the arrangement of the present invention, the operations of the DA converters 4a, 4b, 4c, the W-phase current forming circuit 5, the operational amplifier 6 and the pulse-width modulating circuit 7 of the conventional arrangement shown in FIG. 1 are implemented by the arithmetic unit 10 and programmable interval timer 11.

The operation of the arrangement embodied in FIG. 4 will now be described. When the processor 30 of the arithmetic unit 3 calculates the amplitude command Id and retrieves the U-phase current command Iud in the manner described above, the amplitude command Id, the U-phase current command Iud and the commanded velocity CV are delivered to the arithmetic unit 10 through the bus 36. The arithmetic unit 10 executes the following processing based on a calculation program stored in an internal memory thereof:

(1) The V- and W-phase current commands Ivd, Iwd, respectively, are calculated from the input U-phase current command Iud (current command calculation step).

The commanded velocity CV is given. Therefore, since the period of the sinusoidal signals is known, the V- and W-phase current commands Ivd, Iwd are obtained if the U-phase current command is calculated using values delayed in phase by 120° and 240°.

(2) The U-, V- and W-phase current commands Iud, Ivd, Iwd are multiplied by the input amplitude command Id to calculate the current commands Iu, Iv, Iw in the respective phases (phase current command calculation step).

(3) The actual phase currents Iau, Iav are read from the AD converter 12d to calculate the W-phase actual current Iaw (actual phase current calculation step).

(4) The differences are computed between the current commands Iu, Iv, Iw of the respective phases and the actual phase currents Iau, Iav, Iaw, respectively, whereby three-phase AC signals iu, iv, iw are obtained (three-phase alternating current calculation step).

(5) The three-phase AC signals iu, iv, iw obtained are proportionally integrated (proportional integration step).

(6) Pulse width command signals are calculated from these three-phase AC signals iu, iv, iw (pulse width command calculation step).

Figure 5:
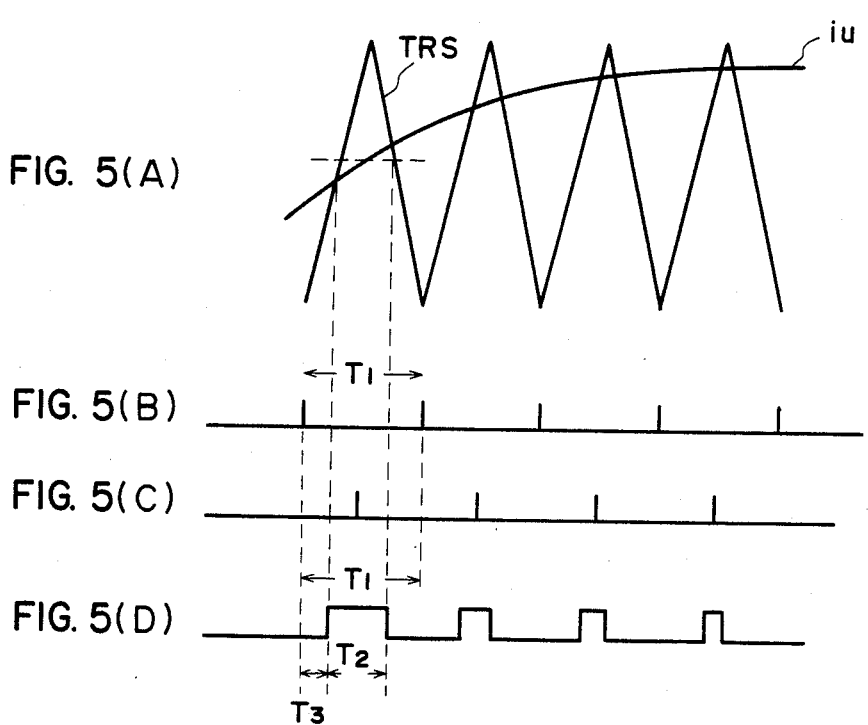
FIG. 5 is a view for describing the operation of a pulse-width modulating circuit which relies upon triangular wave comparison.

The foregoing will now be described with reference to FIG. 5. Let the period of the triangular signal TRS shown in FIG. 5(A) be represented by T1, as shown in FIG. 5(B), and let the midpoint of the period T1 serve as a sampling pulse, see FIG. 5(C). A value T2 of pulse width (ON time) is calculated, which value corresponds to a value iud of the AC signal iu that prevails at generation of the sampling pulse. This is obtained from the calculation k.(iu$_{max}$−iud).

Here, iu$_{max}$ represents a maximum set value of the AC signal, and k is a constant. Next, a time (OFF time) T3 is calculated from the periodic pulses by performing the following operation:

$$T3=(T1-T2)/2$$

The V- and W-phase AC signals iv, iw are calculated in a like manner. These calculations are performed every period of the triangular waves to produce pulse width command signals T2, T3.

(7) These pulse width command signals TU2, TU3, TV2, TV3, TW2, TW3 in the respective phases applied to the processor 30 through the bus 36.

Next, the processor 30 applies the pulse width command signals TU2 through TW3 to the timer 11 via the bus 36. The timer 11 is composed of two timers, one in each phase. After the first timer times the command signal TU3, the second timer times the command signal TU2. Therefore, as shown in FIG. 5(D), the second timer produces the pulse-width modulated signal iuc (FIG. 3). The signal is OFF for a time T3 following the periodic pulse, and is ON for a time T2 upon passage of the time T3. The pulse-width modulated signals ivc, iwc in the V and W phases, respectively, are produced in a similar manner. These pulse-width modulated signals iuc, ivc, iwc are applied to the inverter 8 to drive the motor 1.

It should be noted that the above-described arithmetic unit is a well-known signal processor (e.g., the μPD7720 manufactured by Intel Corp.). Therefore, since signals cannot be transferred to other circuitry without the intervention of the processor 30, the arrangement is such that the pulse width commands are applied to the timer 11 through the processor 30. However, the invention is not limited to this arrangement.

Figure 6:
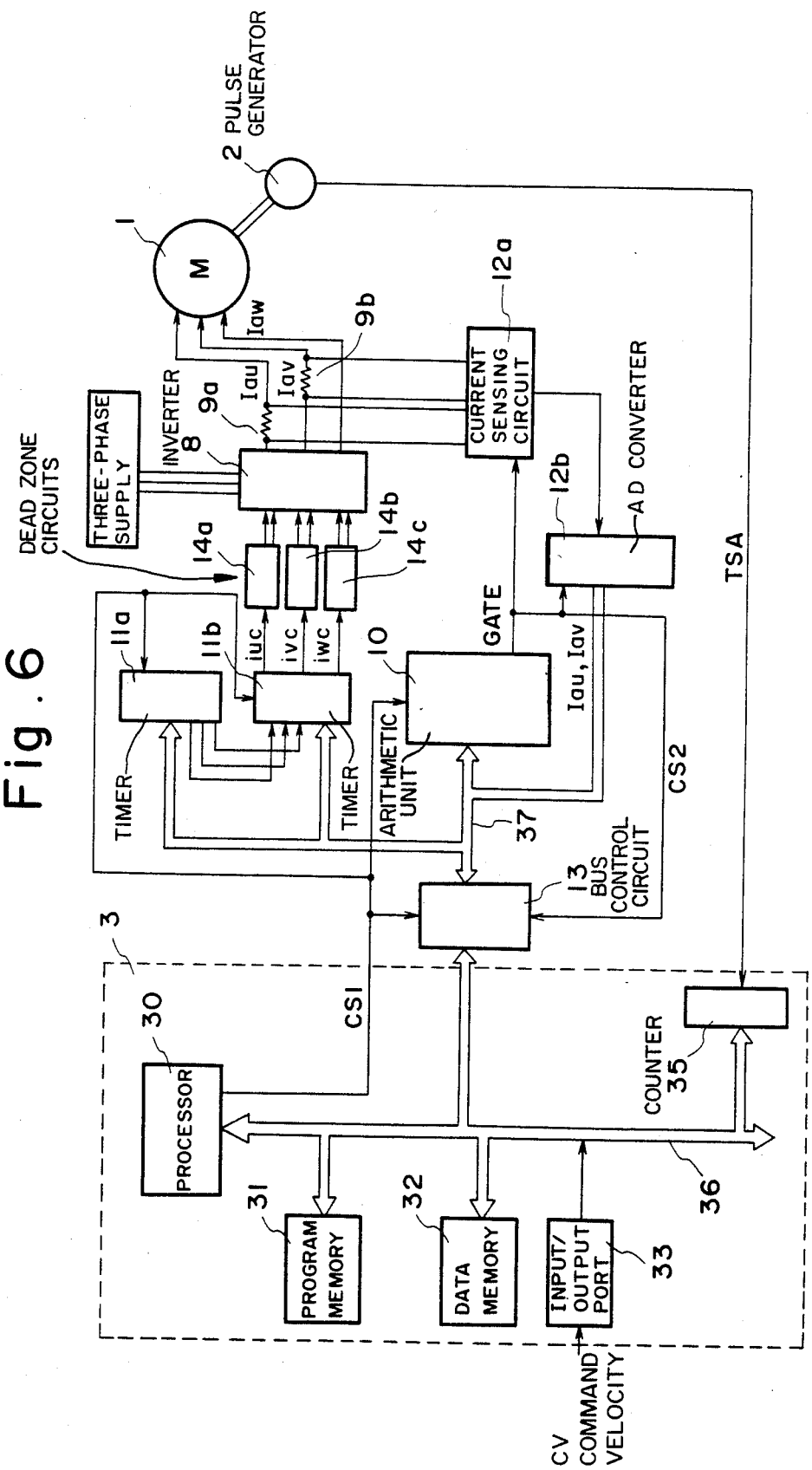
FIG. 6 is a block diagram illustrating another embodiment of the present invention.
Figure 7:
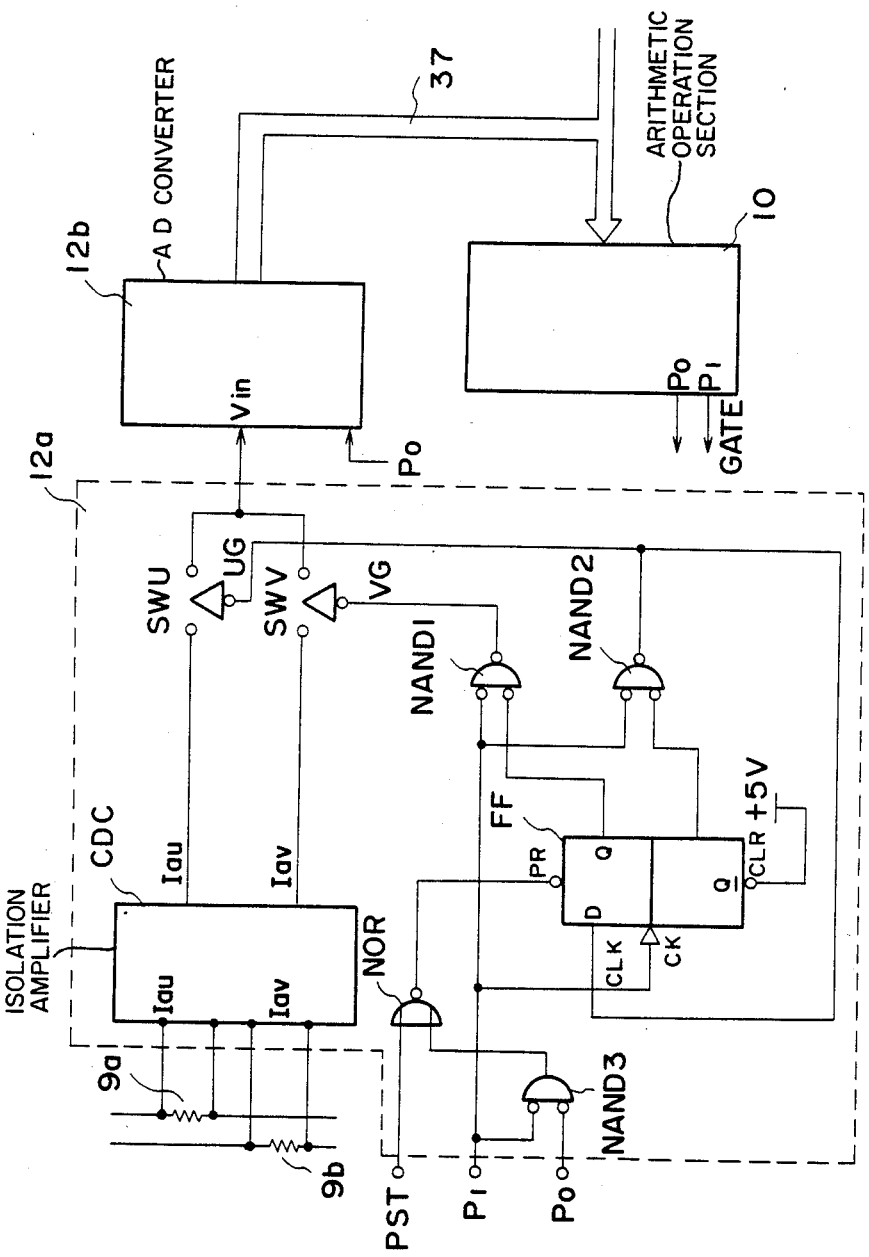
FIG. 7 is a circuit diagram illustrating the construction of a current sensing circuit in FIG. 6.
Figure 8:
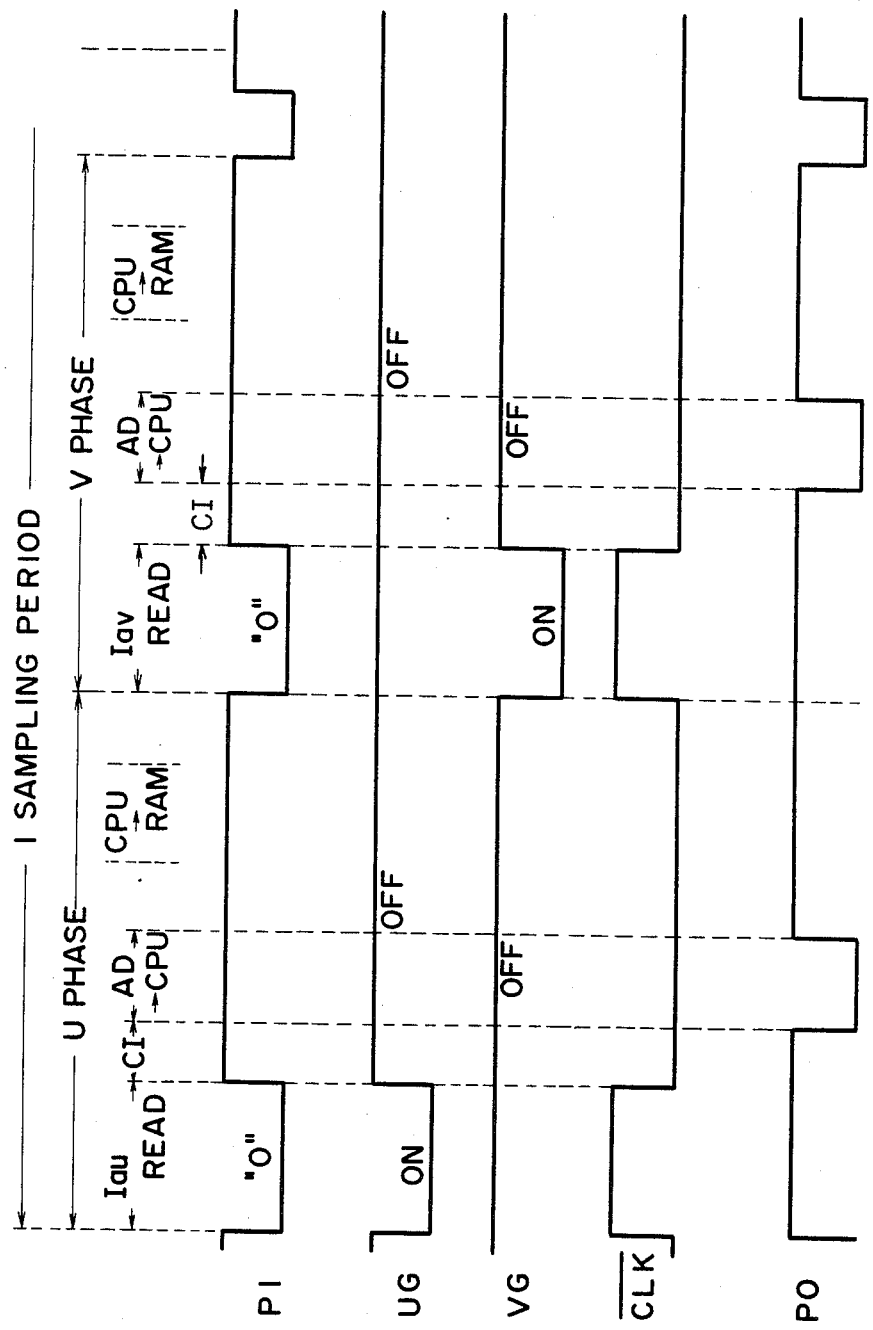
FIG. 8 is a waveform diagram illustrating waveforms associated with various portions of the current sensing circuit of FIG. 6.

FIG. 6 is a block diagram illustrating another embodiment of the present invention, in which portions similar to those shown in FIGS. 1 and 4 are denoted by like reference characters. Numeral 10 denotes an arithmetic unit coupled to the bus 36 of the processor 30 via a bus control circuit, described below, for performing processing in accordance with commands from the processor 30. Numerals 11a, 11b denote programmable interval timers (hereafter referred to as timers) for producing pulse-width modulated signals in accordance with pulse width command signals. Numeral 12a denotes a current sensing circuit which includes an isolation amplifier for amplifying the phase currents Iav, Iau sensed by current sensors 9a, 9b, each of which comprises a resistor, and a mixing circuit for delivering the phase currents Iav, Iau in a time-sharing manner. Numeral 12d designates an analog/digital conversion circuit (hereafter referred to as an AD converter) for converting the analog phase currents Iav, Iau from the mixing circuit of the current sensing circuit 12a into digital values, which are then applied to the arithmetic unit 10. FIG. 7 illustrates the details of the sensing circuit. The arrangement of FIG. 7 is composed of an isolation amplifier CDC for amplifying the phase currents Iav, Iau sensed by the current sensors 9a, 9b, respectively, a pair of analog switches SWU, SWV for introducing the amplified phase currents Iau, Iav, which are the outputs of the isolation amplifier CDC, to the AD converter 12b in a time-sharing manner, a flip-flop FF acting as a switching circuit for controlling the switching of the analog switches SWU, SWV, NAND gates NAND1, NAND2 and NAND3, and a NOR gate NOR. Operation of this circuit will be described with reference to FIG. 8. When a GATE signal provided by a terminal P1 of the arithmetic unit 10 attains a low level ("0"), the NAND gates NAND1, NAND2 open to deliver the Q, Q̄ outputs of the flip-flop FF as signals VG, UG, respectively, with the initial states of the Q, Q̄ outputs being "1". More specifically, since the input to the flip-flop FF is the GATE signal, which serves as a clock signal, the flip-flop changes state at the negative-going transition of the GATE signal when the signal is at the low level ("0"), so that the Q output goes to "1" and the Q̄ output goes to "0". The NAND gates NAND1, NAND2 therefore deliver "1", "0" outputs, respectively. Since the analog switches SWU, SWV turn on when the signals input thereto are at the low level ("0"), the analog switch SWU is turned on by the low-level signal UG to send the phase current Iau to the AD converter 12b. When the GATE signal returns to the high level ("1"), the outputs of both NAND gates NAND1, NAND2 attain the high level "1", so that the analog switch SWU is turned off. As a result, the phase current Iau is read into the AD converter 12b only during the time that the GATE signal is at the low level, with the AD converter 12b converting the phase current Iau from an analog quantity into a digital quantity. There is provided a change inhibit interval CI for the analog switches so that a phase current will not be reapplied to the AD converter during the conversion period. Thereafter, when a control signal provided by a terminal Po of the arithmetic unit decays (attains the low level "0"), the phase current Iau, converted into digital form, is transferred from the AD converter 12b to the arithmetic unit 10 via the bus 37. The arithmetic unit 10 stores the phase current Iau in an internally located random-access memory (RAM). Next, when the GATE signal again attains the low level ("0"), the flip-flop FF changes state, the Q, Q̄ outputs thereof go to "0", "1", respectively, and the outputs VG, UG of the NAND gates NAND1, NAND2 go to "0", "1", respectively. Consequently, the analog switch SWV is turned on, so that the phase current Iav is delivered to the AD converter 12b. When the GATE signal returns to the high level ("1"), the outputs of both NAND gates NAND1, NAND2 attain the high level "1", so that the analog switch SWV is turned off. As a result, the phase current Iav is read into the AD converter 12b only during the time that the GATE signal is at the low level, with the AD converter 12b converting the phase current Iav from an analog quantity into a digital quantity. Thereafter, as in the case of the phase current Iau, the change inhibit interval CI is provided, the phase current Iav from the AD converter 12b is transferred to the arithmetic unit 10 via the bus 37, and the arithmetic unit 10 stores the phase current Iav in the internally located RAM. Next, the arithmetic unit 10 sends both the GATE signal and control signal at the terminals Pl, Po to the low level, whereby the NAND gate NAND3 issues a high-level output, sending the output of the NOR gate NOR to the low level. The NOR gate output is applied to the preset terminal PR of the flip-flop FF, thereby placing the flip-flop FF in the preset state.

Thus, the arithmetic unit 10 obtains the phase currents Iau, Iav when necessary, and the digital values of the two-phase currents Iau, Iav are obtained by a single AD converter.

Figure 9:
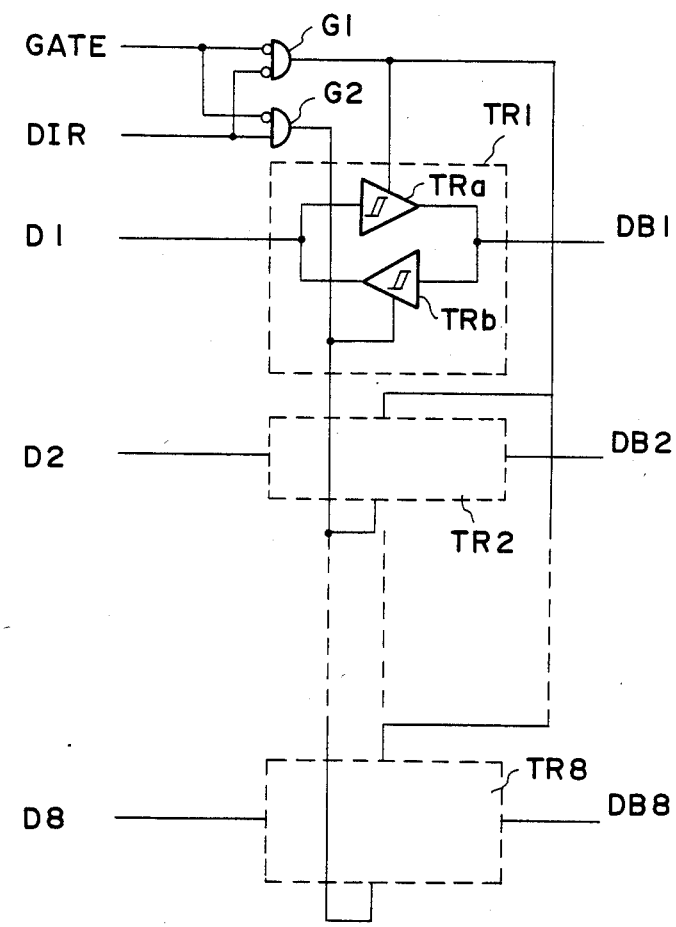
FIG. 9 is a view showing the construction of a bus control circuit shown in FIG. 6.

Returning to FIG. 6, numeral 13 denotes a bus control circuit which, in response to a command, connects and disconnects the bus 36 on the side of the processor 30 of arithmetic unit 3, and the bus 37 on the side of the arithmetic unit 10. As shown in FIG. 9, the bus control circuit 13 is composed of gate circuits G1, G2, and bidirectional bus transceivers TR1 through TR8 corresponding to the lines of the buses 36, 37. The bidirectional bus transceivers TR1 through TR8 are provided for interconnecting lines D1 through D8 of the bus 36 on the side of the processor 30 and respective ones of lines DB1 through DB8 of the bus 37 on the side of the arithmetic unit 10. Each bus transceiver has a pair of transceivers TRa, TRb. Each bidirectional bus transceiver is controlled by output signals from the gate circuits G1, G2. When the gate signal GATE is at the low level ("0"), one of the transceivers TRa, TRb is placed in a high impedance mode, depending upon the level ("1" or "0") of a direction indicating signal DIR, whereby a transfer becomes possible in a direction decided by the transceiver which is not placed in the high impedance mode. For example, if the direction indicating signal DIR is at the low level ("0"), then the output of the gate circuit G1 will go to the high level ("1"), the output of the gate circuit G2 will go to the low level ("0"), and the transceiver TRb will be placed in the high impedance mode. Therefore, a transfer by the transceiver TRa becomes possible from left to right in the Figure, i.e., from the processor 30 to the arithmetic unit 10. On the other hand, if the direction indicating signal DIR is at the level ("1"), a transfer becomes possible from the arithmetic unit 10 to the processor 30 in similar fashion. When the gate signal GATE is sent to the high level ("1"), the outputs of both gate circuits G1, G2 go to the low level ("0"), so that both of the transceivers TRa, TRb attain the high impedance mode to sever the lines D1 through D8 of the bus 36 from the respective lines DB1 through DB8. Then, utilizing the bus 36, the processor 30 performs an exchange of signals with the program memory, etc., connected to the bus 36, and the arithmetic unit 10 utilizes the bus 37 to perform, independently, an exchange of signals with the AD converter 12d connected to the bus 37.

Figure 10:
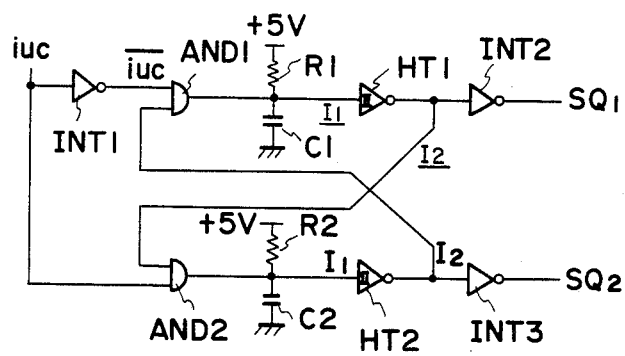
FIG. 10 is a circuit diagram of a dead zone generating circuit shown in FIG. 6.

Returning to FIG. 6, numerals 14a, 14b, 14c denote dead zone generating circuits for applying a dead zone with respect to each of the PWM signals iuc, ivc, iwc from the timer 11b. Depending upon the carrier charging times of the power transistors Q1 through Q6 of the inverter 8 (FIG. 2), there are occasions where the power transistors (e.g., Q1 and Q2) that are disposed one above the other are both turned on at the same instant. Accordingly, the dead zone generating circuits provide an interval during which the base signals of the upper and lower transistors are both turned off, thereby to prevent a short circuit. As shown in FIG. 10, the dead zone generating circuit is an inverter circuit INT1 for inverting the PWM signal iuc, AND gates AND 2, AND1 for the PWM signal iuc, a first integrating circuit composed of a first resistor R1 and a first capacitor C1 for integrating the PWM signal iuc, which has been inverted, a second integrating circuit composed of a second resistor R2 and a second capacitor C1 for integrating the PWM signal iuc, signal inverting-type hysteresis circuits HT1, HT2 connected to the respective integrating circuits, and inverter circuits INT2, INT3.

Figure 11:
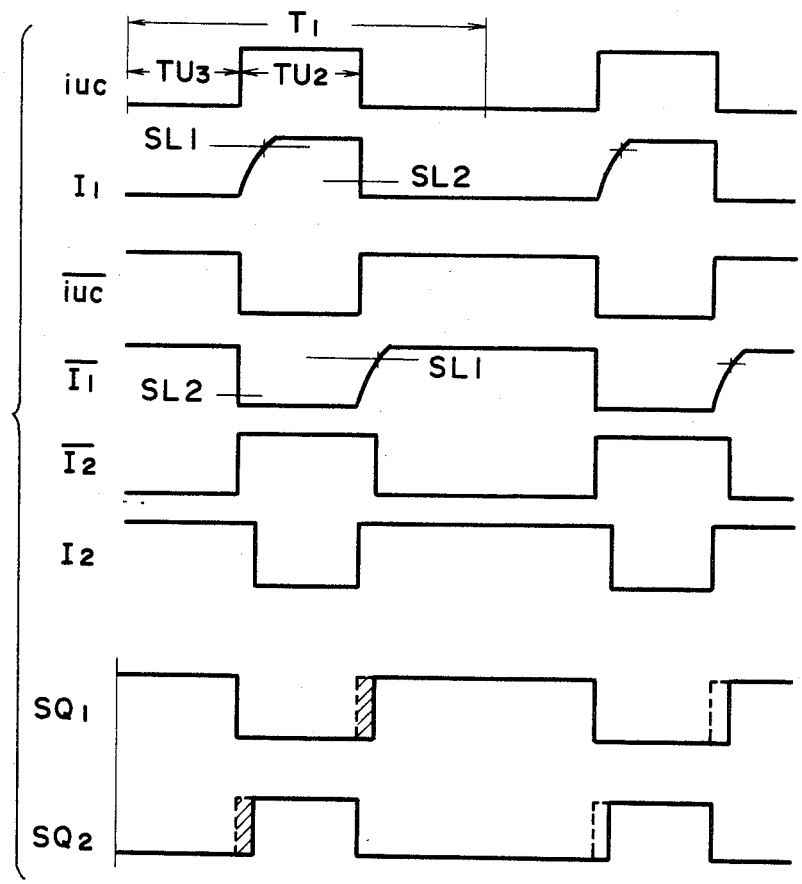
FIG. 11 is a waveform diagram illustrating waveforms associated with various portions of the dead zone generating circuit shown in FIG. 10.

The operation of the circuit shown in FIG. 10 will now be described on the basis of the various waveforms of FIG. 11. The PWM signal iuc is applied as an input to the second integrating circuit via the AND gate AND 2, and the PWM signal iuc, which has been inverted by the inverter circuit IN, is applied as an input to the first integrating circuit through the AND gate AND1. The values of the capacitors and resistors are determined in such a manner that each integrating circuit will possess a time constant during rise time but not during fall time. Accordingly, at the leading edge of the PWM signal iuc, the second integrating circuit generates a gradually rising integrated output $I_1$ and the first integrating circuit generates a suddenly decaying integrated output $I_1$. At the trailing edge of the PWM signal iuc, the second integrating circuit generates a suddenly decaying integrated output $I_1$ and the first integrating circuit generates a gradually rising integrated output $I_1$. These integrated outputs $I_1$, $I_1$ are applied to the respective hysteresis circuits HT1, HT2. The hysteresis circuits HT1, Ht2 are constructed so as to have a leading edge slice level SL1 and a trailing edge slice level SL1 which differ from each other. The leading edge level SL1 is set high, and the trailing edge level SL2 is set low. The hysteresis circuits HT1, HT2 therefore generate respective outputs $I_2$, $I_2$, which are inverted by the inverter circuits INT2, INT3 to be delivered as the inverter drive signals SQ1, SQ2. More specifically, the inverter drive signal SQ1 is at the low level ("0") for a period of time lengthened by the shaded portion, whereas the inverter drive signal SQ2 is at the high level ("1") for a period of time shortened by the shaded portion. The outputs of the hysteresis circuits HT1, HT2 are applied as gate control inputs to the AND gates AND2, AND1, respectively. Thus, a so-called latch circuit configuration is adopted. As a result, useless noise components can be removed to prevent the inverter drive signals SQ1, SQ2 from both attaining the high level ("1") simultaneously due to noise.

Since a dead zone indicated by the shaded portion is thus provided, the transistors Q1, Q2, by way of example, of the inverter 8 (FIG. 2) will not be turned on or off simultaneously. Rather, an interval of time is interposed between the on/off operation of the two transistors. Even though the transistors have charging times, therefore, a short circuit will not occur by transistor Q2 (or Q1) turning on before transistor Q1 (or Q2) has turned off. The foregoing holds for the V-and W-phase PWM signals ivc, iwc as well, and circuits of the same construction are provided for these signals, as shown in FIG. 6.

According to the arrangements embodying the present invention, the operations of the DA converters 4a, 4b, 4c, the W-phase current forming circuit 5, the operational amplifier 6 and the pulse-width modulating circuit 7 of the conventional arrangement shown in FIG. 1, are implemented by the arithmetic unit 10 and the timers 11a, 11b.

Figure 14:
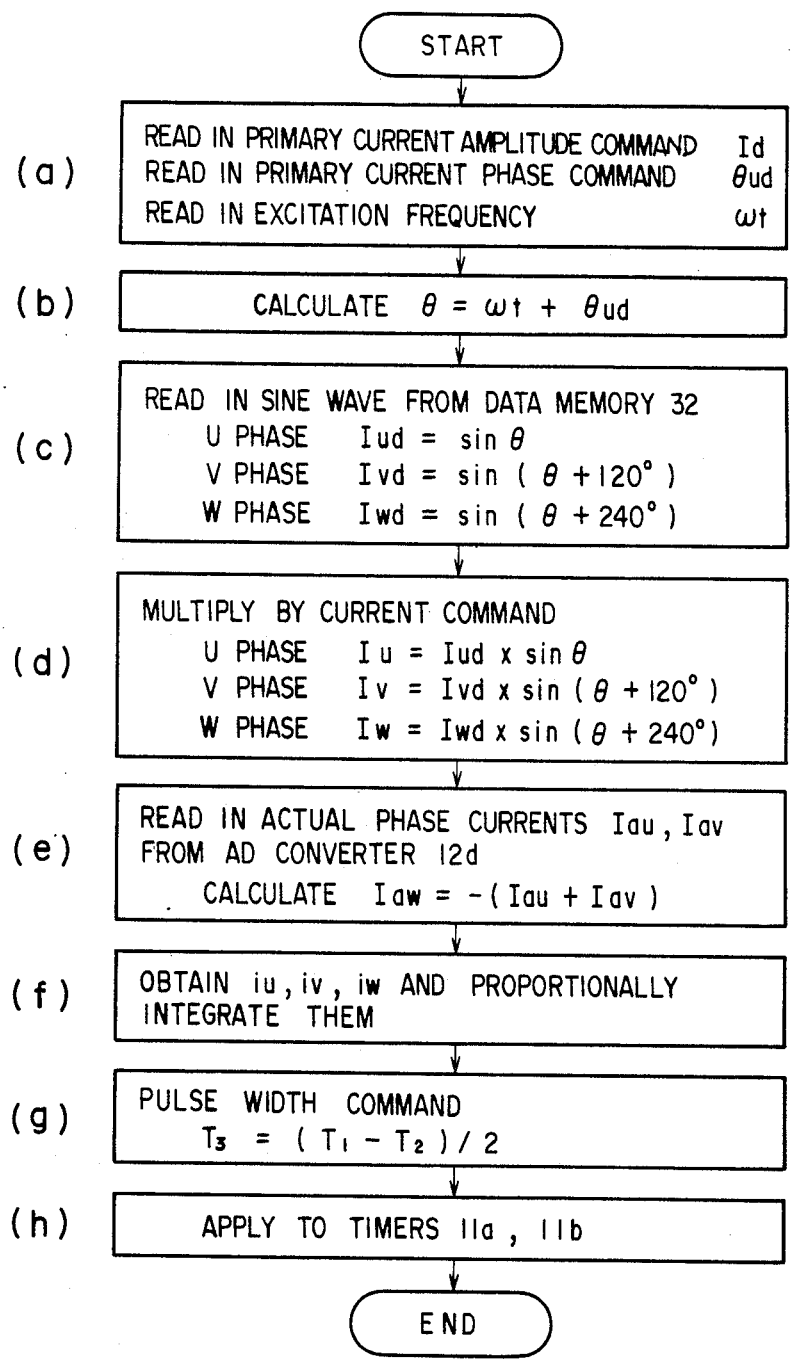
FIG. 14 is a flowchart.

The operation of the embodiment illustrated in FIG. 6 will now be described in conjunction with the flowchart shown in FIG. 14.

First, as in the aforementioned conventional apparatus and the above-described first embodiment, the processor 30 of the arithmetic unit 3 reads in a primary current amplitude command Id, a primary current phase command 0ud, and the excitation frequency ωt (step a) and, in a step b, performs the operation $\theta = \omega t + \theta ud$. Thereafter, the amplitude command Id, U-phase current command Iud and commanded velocity CV are deliverd to the arithmetic unit 10 via the bus 36, bus control circuit 13 and bus 37. The arithmetic unit 10 executes the following processing on the basis of a calculation program stored in an internal memory thereof:

(1) The V- and W-phase current commands Ivd, Qwd respectively, are calculated from the input U-phase current command Iud (current command calculation step) (step c).

The commanded velocity CV is given. Therefore, since the period of the sinusoidal signals is known, the V- and W-phase current commands Ivd Iwd are obtained if the U-phase current command is calculated using values delayed in phase by 120° and 240°.

(2) The U-, V- and W-phase current commands Iud, Ivd, Iwd are multiplied by the input amplitude command Id to calculate the current commands Iu, Iv, Iw in the respective phases (phase current command calculation step) step d.

(3) The arithmetic unit 10 produces the gate signal GATE to place each bus transceiver of the bus control circuit 13 in the high impedance mode, whereby the buses 36, 37 are disconnected from each other. The current sensing circuit 12a delivers the actual phase currents Iau, Iav to the AD converter 12d in alternating fashion, with the AD converter 12d applying the digital values of the actual phase currents Iau, Iav to the arithmetic unit 10 via the bus 37. The arithmetic unit 10, in accordance with well-known calculation formula, calculates the actual phase current Iaw in the W phase from the actual phase currents Iau, Iav (actual phase current calculation step-step c).

(4) The differences are computed between the current commands Iu, Iv, Iw of the respective phases and the actual phase currents Iau, Iav, Iaw, respectively, whereby three-phase AC signals iu, iv, iw are obtained (three-phase alternating current calculation step-step f).

(5) The three-phase AC signals iu, iv, iw obtained are proportionally integrated (proportional integration step-step f).

(6) Pulse width command signals are calculated from these three-phase AC signals iu, iv, iw (pulse width command calculation step-step g).

The foregoing will now be described with reference to FIG. 5. Let the period of the triangular signal TRS shown in FIG. 5(A) be represented by T1, as shown in FIG. 5(B), and let the midpoint of the period T1 serve as a sampling pulse [FIG. 5(C)]. A value T2 of pulse width (ON time) is calculated, which value corresponds to a value iud of the AC signal iu that prevails at generation of the sampling pulse. This is obtained from the calculation k.(iu$_{max}$−iud).

Here, iu$_{max}$ represents a maximum set value of the AC signal, and k is a constant. Next, a time (OFF time) T3 is calculated from the periodic pulses by performing the following operation:

$$T3=(T1-T2)/2$$

The V- and W-phase AC signals iv, iw are calculated in a like manner. These calculations are performed every period of the triangular waves to produce pulse width command signals T2, T3 (step g).

(7) These pulse width command signals TU2, TU3, TV2, TV3, TW2, TW3 in the respective phases applied to the processor 30 through the bus 37, bus control circuit 13 and bus 36.

Figure 12:
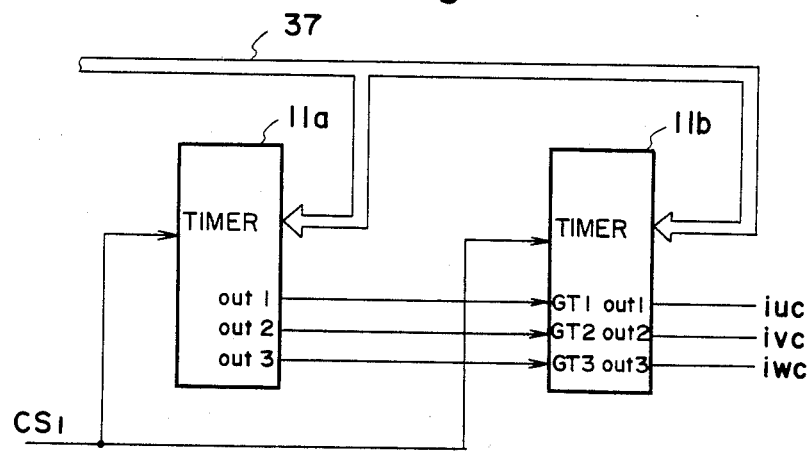
FIG. 12 is a view showing the construction of a timer circuit in the arrangement of FIG. 6.
Figure 13:
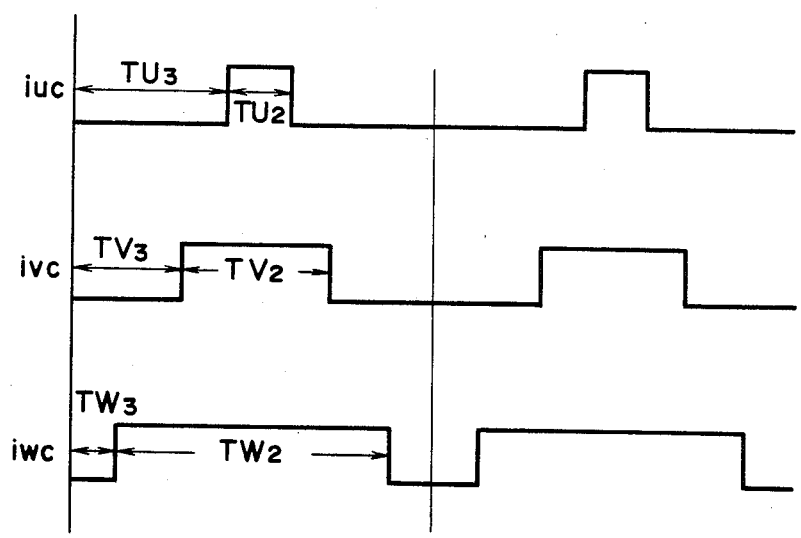
FIG. 13 is a waveform diagram showing the outputs of the timer illustrated in FIG. 12.

With the foregoing the operation of the arithmetic unit 10 ends. Next, the processor 30 provides the timers 11a, 11b with the pulse width command signals TU2 through TU3 via the bus 36, bus control circuit 13 and bus 37. The timers 11a, 11b include timers for each phase. After the command signal TU3 is timed by the first timer 11a, the second timer 11b times the command signal TU2. This will be described on the basis of the block diagram of FIG. 12 showing the details of the timers 11a, 11b. The pulse width command signals TU2, TU3, TV2, TV3, TW2, TW3 are received via the bus 37. In response to a control signal CS1 from the processor 30, the pulse width command signals TU3, TV3, TW3 are set in the timer 11a, and the pulse width command signals TU2, TV2, TW3 are set in the timer 11b. Clock pulses, not shown, are applied and are counted by the timer 11a. In the embodiment of FIG. 12, the timer 11a applies an output out3 to a gate terminal GT3 of the timer 11b when the period of time TW3 expires, whereby the timer 11b begins timing the period of time TW2. Likewise, when the time periods TV3, TU3 are counted, outputs out2, out1 are applied to respective gate terminals GT2, GT1 of the timer 11b, whereby the timer 11b begins timing the time periods TV2, TU2. The timer 11b is reset when it completes the timing of each one of the time periods TW2, TU2, TV2, with the timer 11b issuing a high-level ("1") output for the duration of the timed period. Accordingly, as shown in FIG. 13, pulse-width modulated signals iuc, ivc, iwc are produced in the respective phases.

These pulse-width modulated signals iuc, ivc, iwc are converted into the pulse-width modulated signals SQ1 through SQ6 having the dead zone, this being performed by the dead zone generating circuits 14a, 14b, 14c of the respective phases. The signals SQ1 through SQ6 are then applied to the respective power transistors Q1 through Q6 of the inverter 8, whereby a drive current is applied to the AC motor 1. The transfer of the amplitude command Id and the like from the processor 30 to the arithmetic unit 10, the calculation of the pulse width command signals in the arithmetic unit 10, and transfer of the pulse width command signals from the arithmetic unit 10 to the processor 30, and the transfer of the pulse width command signals from the processor 30 to the timers 11a, 11b, are carried out periodically. Accordingly, the motor 1 is controlled without a delay.

It should be noted that the above-described arithmetic unit is a well-known signal processor (e.g., the μPD7720 manufactured by Intel Corp.). Therefore, since signals cannot be transferred to other circuitry without the intervention of the processor 30, the arrangement is such that the pulse width commands are applied to the timer 11 through the processor 30. However, the invention is not limited to this arrangement.

According to the present invention as set forth above, the entirety of a control current loop in an AC motor control apparatus can be put into digital form and an arithmetic unit on a single chip is employed as second arithmetic means. As a result, the number of component parts can be reduced and the AC motor control apparatus can be lowered in cost. Accordingly, the AC motor control apparatus of the present invention is suitable not only for use as a general-purpose AC motor control apparatus, but also for use as a control apparatus of an AC motor for a spindle in a numerically controlled machine tool.

We claim:

1. An AC motor control apparatus for causing an actual velocity of an AC motor to follow a commanded velocity where said AC motor rotates according to a frequency command, comprising:

first arithmetic means for calculating an amplitude command based n a difference between the commanded velocity and the actual velocity of said AC motor, and for delivering said amplitude command and a current command for at least one phase as outputs;

a current sensing circuit, operatively connected to said AC motor, for sensing actual phase currents of said AC motor;

an analog/digital conversion circuit, operatively connected to said current sensing circuit, for subjecting the actual phase currents of said AC motor to an analog-to-digital conversion;

second arithmetic means, operatively connected to said analog/digital conversion circuit, for calculating a pulse width command in each phase from the ampitude command and phase output thereof by said first arithmetic means, the frequency command and the actual phase currents of said AC motor;

first and second buses respectively connected to said first and second arithmetic means;

a timer, operatively connected to said second bus, for producing as an output a pulse-width modulated signals in each phase on the basis of the pulse-width command from said second arithmetic means;

an inverter, operatively connected to said timer and said AC motor, for driving said AC motor in accordance with the pulse-width modulated signals of said timer; and a bus control cirtcuit, operatively connected between said first arithmetic means and said second arithmetic means, for disconnecting the first bus on the side of said first arithmetic means from the second bus on the side of said second arithmetic means, said analog/digital conversion circuit being connected to the second bus on the side of said second arithmetic means, and the first bus on the side of said first arithmetic means being disconnected from the second bus on the side of said second arithmetic means by said bus control circuit, whereupon said second arithmetic means reads in the actual phase currents from said analog/digital conversion circuit.

2. An AC motor control apparatus according to claim 1, wherein said second arithmetic means produces a bus control signal and said bus control circuit disconnects the first bus on the side of said first arithmetic means from the second bus on the side of said second arithmetic means in response to the bus control signal from said second arithmetic means.

3. An AC motor control apparatus for causing an actual velocity of an AC motor to follow a commanded velocity where said AC motor rotates according to a frequency command, comprising:

first arithmetic means for calculating an amplitude command based on a difference between the commanded velocity and the actual velocity of said AC motor, and for delivering said amplitude command and a current command for at least one phase as outputs;

a current sensing circuit, operatively connected to said AC motor, for sensing actual phase currents of said AC motor;

an analog/digital conversion circuit, operatively connected to said current sensing circuit, for subjecting the actual phase currents of said AC motor to an analog-to-digital conversion;

second arithmetic means, operatively connected to said first arithmetic means, for calculating a pulse width command in each phase from the amplitude command and the phase output thereof by said first arithmetic means, the frequency command and the actual phase currents of said AC motor;

a timer, operatively connected to said second arithmetic means, for producing as an output a pulse-width modulated signal in each phase on the basis of the pulse width command produced by said second arithmetic means;

a dead zone generating circuit, operatively connected to said timer, for applying a dead zone to the pulse-width modulated signals of said timer to produce inverter drive signals; and an inverter, operatively connected to said dead zone generating circuit and said AC motor, for driving said AC motor in accordance with the pulse-width modulated signals of said timer; and said dead zone generating circuit comprising:
an integrating circuit, operatively connected to said timer, for integrating said pulse-width modulated signals and producing an output; and
a hysteresis circuit operatively connected to said integrating circuit and said inverter, having different slice levels with respect to the output from said integrating circuit, the slice level at rise time being different from the slice level at decay time.

4. An AC motor control apparatus according to claim 3, wherein said dead zone generating circuit includes a pair of said integrating circuits, a pair of corresponding hysteresis circuits producing outputs and an inverter operatively connected between said timer and one of said integrating circuits, the pulse-width modulated signals of said timer entering one of the integrating circuits and the pulse-width modulated signals of said timer entering the other of the integrating circuits following inversion by said inverter.

5. An AC motor control apparatus according to claim 4, wherein each integrating circuit comprises a gate circuit receiving the pulse-width modulated signals and the output of a noncorresponding hysteresis circuit being a control input of said gate circuit.

6. An AC motor control apparatus for causing an actual velocity of an AC motor to follow a commanded velocity, comprising:

arithmetic means comprising first arithmetic means and second arithmetic means for calculating ON time depending upon a reference equilateral triangular signal corresponding to a level of a signal to be modulated and the commanded velocity, and for calculating OFF time from the start of said reference equilateral triangular signal based on the period of said reference equilateral triangular signal and said ON time;

first counter means loaded with said OFF time and for counting said OFF time and providing a counter control signal;

second counter means, connected to said first counter means and loaded with said ON time for counting said ON time after said OFF time is counted independence upon the counter control signal and producing an output signal;

a dead zone generating circuit for creating a control signal, from the output signal, having a leading edge rising in accordance with a time constant and a trailing edge falling without a time constant; and an inverter circuit, operatively connected to said dead zone generating circuit and said AC motor, for delivering as an output a pulse-width modulated signal based on the control signal from said dead zone generating circuit.

* * * * *

UNITED STATES PATENT AND TRADEMARK OFFICE
CERTIFICATE OF CORRECTION

PATENT NO. : 4,581,569

DATED : April 8, 1986

Page 1 of 3

INVENTOR(S) : YOSHIKI FUJIOKA ET AL.

It is certified that error appears in the above-identified patent and that said Letters Patent is hereby corrected as shown below:

Col. 1, line 12, [line numbering off], delete "of";

line 39, "value the" should be --value. The--;

line 40, delete ",".

Col. 2, line 8, delete "phase" (second occurrence).

Col. 3, line 6, delete "phase" (second occurrence);

line 57, after "apparatus" insert --in which a--.

Col. 4, line 34, "The invention" should begin a new paragraph;

line 45, "An AC motor" should begin a new paragraph;

line 46, "include" should be --included--;

line 63, "signal the" should be --signal. The--;

line 67, after "also" insert --has--.

Col. 5, lines 63-64 should be merged to form one paragraph.

Col. 7, line 15, after "phases" insert --are--;

line 59, "FIG. 7" should begin a new paragraph.

UNITED STATES PATENT AND TRADEMARK OFFICE
CERTIFICATE OF CORRECTION

PATENT NO. : 4,581,569

DATED : April 8, 1986     Page 2 of 3

INVENTOR(S) : YOSHIKI FUJIOKA ET AL.

It is certified that error appears in the above-identified patent and that said Letters Patent is hereby corrected as shown below:

Col. 8, lines 6, 7 and 38, "Q, Q" should be --Q, $\underline{Q}$--;

line 13, "Q" should be --$\underline{Q}$--.

Col. 10, line 16, "$I_1$" should be --$\underline{I_1}$--;

line 18, "Ht2" should be --HT2--;

line 23, "$I_2$" should be --$\underline{I_2}$--;

line 63, "Oud" should be --Θud--.

Col. 11, line 4, "Qwd" should be --Iwd--;

line 17, "step) step d" should be --step - step d)--;

line 30, "c" should be --e--;

line 62, after "phases" insert --are--;

Col. 13, line 23, delete "a";

UNITED STATES PATENT AND TRADEMARK OFFICE
CERTIFICATE OF CORRECTION

PATENT NO. : 4,581,569

DATED : April 8, 1986

INVENTOR(S) : Yoshiki Fujioka et al

It is certified that error appears in the above-identified patent and that said Letters Patent is hereby corrected as shown below:

Column 14, line 55, "inde-" should be -- in de- --.

[SEAL]

Signed and Sealed this

Twenty-second Day of July 1986

Attest:

DONALD J. QUIGG

Attesting Officer

Commissioner of Patents and Trademarks